United States Patent [19]

Caron

[11] Patent Number: 4,969,694
[45] Date of Patent: Nov. 13, 1990

[54] WHEEL HUB MOUNTING WITH A PULSE TRANSMITTER

[75] Inventor: Fabrice Caron, Montigny le Bretonneux, France

[73] Assignee: SKF France, Clamart Cedex, France

[21] Appl. No.: 270,870

[22] Filed: Nov. 14, 1988

[30] Foreign Application Priority Data

Nov. 16, 1987 [FR] France .................. 87 15794

[51] Int. Cl.$^5$ .................................. B60T 8/32
[52] U.S. Cl. ............................ 303/1; 188/181 A; 310/168
[58] Field of Search .......... 188/181 A, 181 R, 181 C, 188/181 T, 180; 303/1, 113; 310/168, 67 R, 169, 170, 155, 156, 77, 78

[56] References Cited

U.S. PATENT DOCUMENTS

| 3,626,226 | 12/1971 | Pauwels et al. | 310/168 |
| 3,745,392 | 7/1973 | Phoenix et al. | 310/168 |
| 3,772,550 | 11/1973 | Anselmino | 310/168 |
| 3,826,933 | 7/1974 | Anselmino | 310/168 |
| 3,887,046 | 6/1976 | Bueler | 188/181 A |
| 3,928,780 | 12/1976 | Vannini | 310/168 |
| 3,949,252 | 4/1976 | Riesenberg et al. | 310/168 |

FOREIGN PATENT DOCUMENTS 2301014 9/1976 France .
2133955 12/1976 France .
2558223 7/1985 France .
2570143 3/1986 France .

OTHER PUBLICATIONS

Automotive Engineer, vol. 5, No. 1, Feb./Mar. 1980, #4514, pp. 62–63, St. Edmunds, Suffolk, GB; "Automotive Hub Design-Part 2".

Primary Examiner—Matthew C. Graham
Attorney, Agent, or Firm—Beveridge, DeGrandi & Weilacher

[57] ABSTRACT

A vehicle non-driving wheel hub mounting equipped with a pulse-transmitter and sensor assembly comprises an integral rolling bearing (1, 2, 11, 12) with two rows of rolling elements (1). The active parts (16, 17) of the pulse transmitter and the sensor (18) are accommodated and positioned inside a volume delimited radially by the cylindrical inner surface (10) of a tubular protuberance (7). The protuberance also centers the brake disc (5) or drum and the wheel (6). The volume is delimited axially in one direction by a plane passing through the free end (20) of the tubular protuberance (7) and in the other direction by a plane passing through the large face (21) of the inner ring (11) of the rolling bearing located on the same side as the locking nut (15). The inner rings are axially locked by a locking component, and the sensor is radially inserted in a radially oriented receptacle formed in an external surface of the locking component.

29 Claims, 3 Drawing Sheets

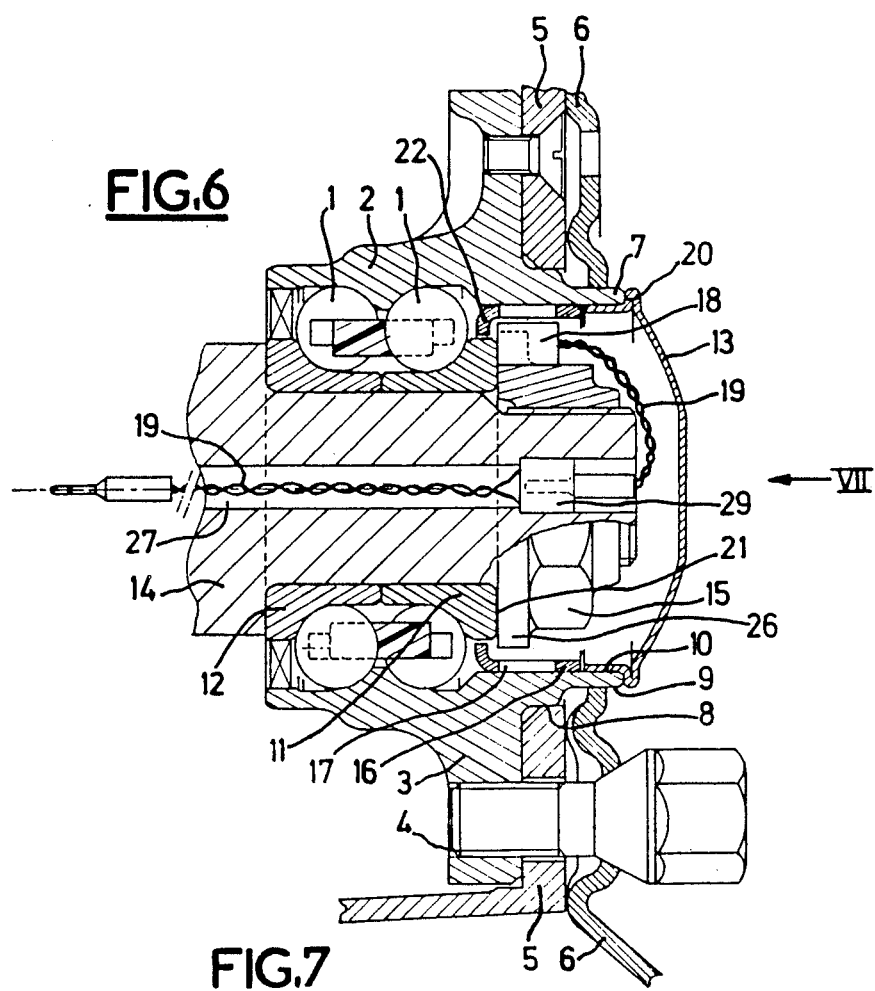

WHEEL HUB MOUNTING WITH A PULSE TRANSMITTER

BACKGROUND OF THE INVENTION

The present invention relates to vehicle nondriving wheel hub mountings using a rolling bearing with a double row of balls or of rollers of the so-called "integral" type. The invention further includes a pulse-transmitter/sensor assembly accommodated in this rolling bearing and intended for transmitting the information on the rotational speed of the wheel to a wheel anti-lock (or ABS) device.

The solution adopted most frequently at the present time is described in the document FR-A-2,570,143. The pulse transmitter is fitted onto a bearing surface machined on the outside diameter of the rotating outer ring of the rolling bearing and on the opposite side to the fastening of the wheel. The sensor is arranged facing the pulse transmitter, being carried by a stationary part of the vehicle radially outside the pulse transmitter.

The main disadvantages of such a device are:
the costly machining of the additional bearing surface for fastening the pulse transmitter,
the considerable radial bulk of the assembly,
the exposure of the pulse transmitter and of the sensor to external agents, such as rain, dirt and various splashes, thus resulting in risks of corrosion of the pulse transmitter or possible operational disruptions,
the risks of damage to the pulse transmitter during the handling of the rolling bearing,
the influence of the clamping of the pulse transmitter on the internal operating play of the rolling bearing, and
the inaccessibility of the device after it has been mounted on a vehicle.

The document FR-A-2,301,014 also makes known a rolling bearing, in which the pulse transmitter and the sensor are accommodated in the inner volume of the rolling bearing, but here the rolling bearing has to have a special design and be given forms and dimensions suitable for receiving the sensor and the pulse transmitter. This results in high additional production costs.

According to another solution, described in the document FR-A-2,558,223, the pulse transmitter and the sensor are accommodated inside flanges fitted onto inner bearing surfaces of the rolling bearing. The disadvantages of this system lies in the fact that the system is delicate, it becomes necessary to manipulate the rolling bearing with the output wires of the sensor in place, thus entailing risks of damage to the assembly. After the system has been mounted on a vehicle, it is no longer possible to change the sensor without dismantling the rolling bearing.

SUMMARY OF THE INVENTION

The object of the invention is to eliminate the preceding disadvantages, that is to say to provide a hub mounting with a pulse transmitter and a sensor, which does not require a special arrangement of the rolling bearing and ensures the complete protection of the pulse transmitter and of the sensor. The assembly nevertheless allows easy access to the pulse transmitter and to the sensor, for the purpose of a possible check or exchange without dismantling the rolling bearing.

In a rolling bearing of the integral type, not of special design, the invention consists in arranging the pulse transmitter and the sensor inside a volume delimited radially by the cylindrical inner surface of the tubular protuberance of the rotating outer ring of the rolling bearing. The protuberance also serves for centering the brake disc or drum and the wheel. The volume is delimited axially on the one hand by a plane passing through the free end of the tubular protuberance and on the other hand by a plane passing through the large face of the inner ring of the rolling bearing located on the same side as the locking nut.

For this purpose, the pulse transmitter is simply fitted into the cylindrical bore of the tubular protuberance, without any additional machining, whilst the sensor is placed in a receptacle located either in the nut or in an accessory piece immobilized on or by the nut.

BRIEF DESCRIPTION OF THE DRAWINGS

Other particular features of the invention will emerge from the following description of an embodiment taken as an example and illustrated in the accompanying drawing, in which:

FIG. 6 is an axial section of a third embodiment;
FIG. 7 is a partial end view according to VII of FIG. 6;
and
FIG. 8 is a partial axial section of an alternative embodiment of the pulse transmitter on a larger scale.

DETAILED DESCRIPTION OF THE INVENTION

Figure 1:
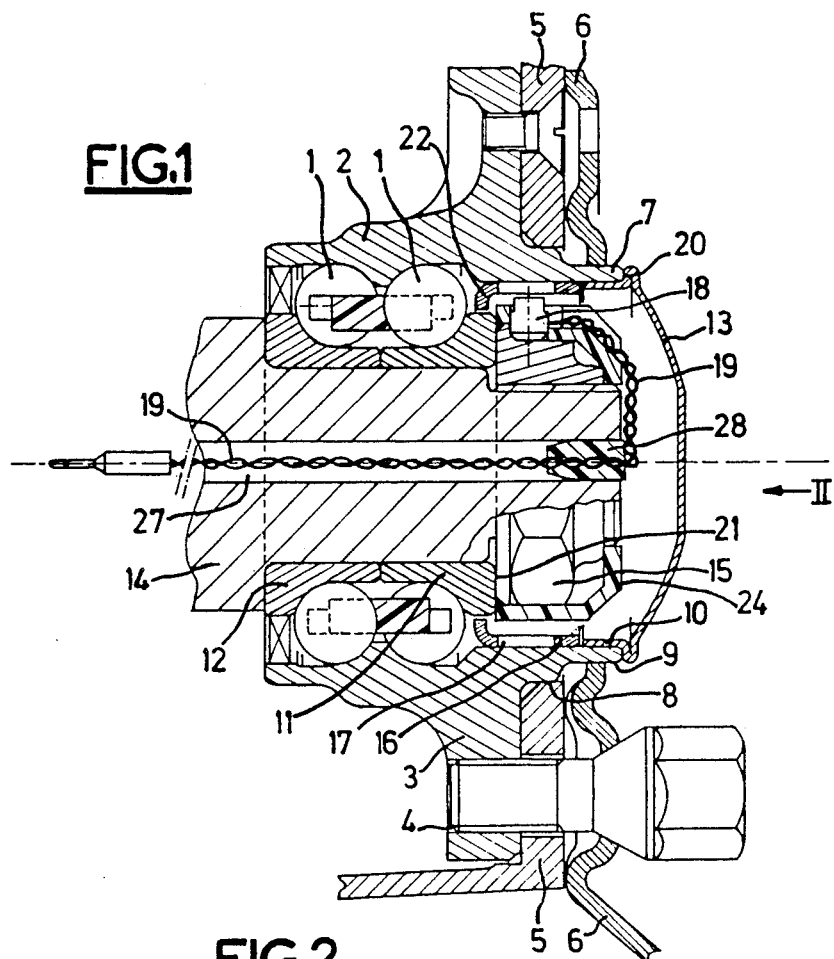
FIG. 1 shows a first embodiment in axial section.

The present invention relates to the mounting of vehicle non-driving wheel hubs, comprising:
a ball bearing or roller bearing of the "integral" type with two rows of rolling elements 1. This type of rolling bearing being characterized, in relation to a conventional rolling bearing with a double row of rolling elements, in that its outer ring 2 possesses:
a flank equipped with holes 4 for the direct fastening of the brake disc 5 and of the wheel 6; and
a tubular protuberance 7 projecting axially relative to the flank 3 and possessing one or, more generally, two bearing surfaces 8 and 9 for respectively centering the brake disc 5 and the wheel 6 on the rolling bearing. This tubular protuberance 7 also possesses an inner clearance bore 10 serving, on the one hand, for the passage of that inner ring 11 of the inner rings 11 and 12 of the rolling bearing located on the same side as this protuberance 7 and of other inner elements of the rolling bearing during its assembly and, on the other hand, for the fitting and centering of a protective cover 13 which closes the assembly, once the rolling bearing has been fastened to the axle journal 14 by means of the locking nut 15.

The wheel hub also includes the abovementioned axle journal 14, on which the inner rings 11 and 12 of the rolling bearing are fastened by means of the said locking nut 15.

A pulse transmitter 16, also called a phonic wheel, is included which has the general form of a cylindrical collar equipped with radial perforations 17 or with teeth.

A sensor 18 detects detecting the rotation of the pulse transmitter 16 and transmits the information to the electronic system of the anti-lock device by means of electrical wires 19.

The passage of the teeth or the radial perforations 17 of the pulse transmitter 16 in front of the sensor 18 generates electrical pulses, the frequency of which is proportional to the rotational speed of the wheel 6.

According to a first characteristic of the invention, the active part of the pulse transmitter 16 and the sensor 18 are accommodated completely and positioned, without any previous modification or adjustment of the form or design of the rolling bearing, inside a volume delimited as follows:

radially by the cylindrical inner surface 10 of the tubular protuberance 7, serving for centering the brake disc 5 or drum and the wheel 6, and axially on the one hand by a plane passing through the free end 20 of the tubular protuberance 7 and on the other hand by a plane passing through the large face 21 of the inner ring 11 of the rolling bearing located on the same side as the locking nut 15.

In fact, the pulse transmitter 16 is simply fitted into the cylindrical bore 10 of the tubular protuberance 7, without any additional machining and without an additional fastening element attached to the rolling bearing. This pulse transmitter is preferably produced by stamping and radial notching, but any other method of production could be used, for example a collar with inner radial toothing.

According to another characteristic of the invention, the pulse transmitter 16 has a radial wing 22 directed inwards and towards the inner ring 11. This serves not only as a stiffener, but also provides a barrier to any inopportune escape of grease from the rolling bearing.

The grease may be confined either by means of a simple narrow passage made between the wing 22 and the inner ring 11 of the rolling bearing, or by the addition of a sealing lip 23 moulded onto the radial wing 20 of the pulse transmitter and coming into contact with the inner ring 11 of the rolling bearing, as shown in the detail of FIG. 8.

Finally, a last characteristic of the invention consists in placing the sensor 18 in a receptacle made either in the nut 15 or in an accessory piece immobilized on or by the nut.

Figure 2:
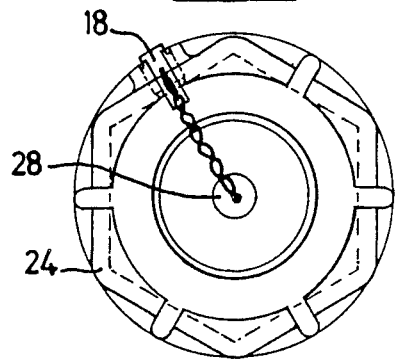
FIG. 2 shows the cap of the nut in an end view according to II of FIG. 1.
Figure 3:
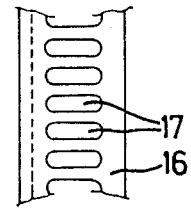
FIG. 3 shows a fragment of the layout of the pulse transmitter.

In the embodiment of FIGS. 1 and 2, the sensor 18 is fitted elastically into its receptacle formed in a bonnet 24 made of moulded material and itself fastened by elastic fitting onto the nut 15 or onto the base of the latter.

Figure 4:
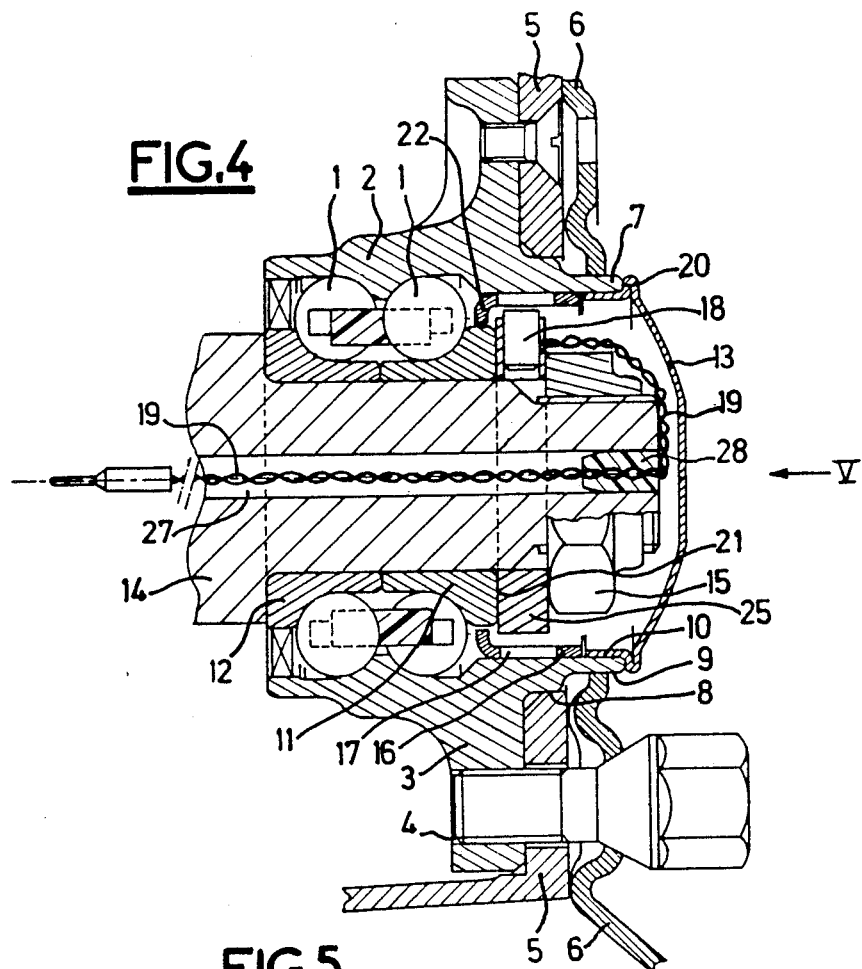
FIG. 4 is an axial section of a second embodiment.
Figure 5:
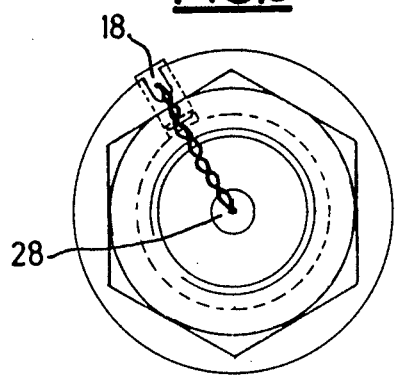
FIG. 5 is a partial end view according to V of FIG. 4.

In the second embodiment of FIGS. 4 and 5, the sensor 18 is fastened in a thick washer 25 which is locked between the nut 15 and the face 21 of the inner ring 11 of the rolling bearing.

Finally, in the embodiment of FIGS. 6 and 7, the sensor 18 is fastened in a receptacle formed directly in the nut 15 or in its base 26.

In all of the embodiments, the wires 19 leaving the sensor 18 and going towards the electronic analyze device pass within a duct 27 formed in the axle journal according to a known arrangement. The wires are held in place by means of a plug 28 which closes the entrance of the duct, or by means of a connector 29 in the exemplary embodiment of FIG. 6.

Finally, the protective cover 13 fitted into the bore 10 of the radial protuberance 7 isolates the sensor/pulse-transmitter assembly and the inner part of the rolling bearing from the external environment.

The main advantages of the device according to the invention are as follows:

the absence of any additional bulk because of a complete integration of the pulse-transmitter/sensor assembly inside the volume of the rolling bearing;

the absence of any additional machining on the rolling bearing for fastening the pulse transmitter, thus entailing a reduced cost; and the use of a same type of rolling bearing for mountings with or without ABS. In both cases, the rolling bearing is a standard integral rolling bearing, and subsequently adapting the pulse-transmitter/sensor assembly to it does not require any modification in terms of form or special machining on the rolling bearing.

Additional advantages include the following:

functioning of the pulse-transmitter/sensor assembly in a closed and clean chamber, preventing any risk of pollution and corrosion, thus resulting in excellent reliability and consistency of the device;

excellent protection of the pulse transmitter during manipulations of the rolling bearing, preventing any risk of damage as a consequence of shocks;

the absence of any risk of a change of the internal play of the rolling bearing during the fitting of the pulse transmitter; and very easy access to the detection assembly simply by removing the protective cover, with the possibility of changing a faulty sensor without dismantling or damaging the rolling bearing.

I claim:

1. A vehicle wheel hub assembly comprising:
    an axle journal having a cylindrical portion and a threaded end portion with an outer end face;
    an integral rolling bearing having two rows of rolling elements located between two inner rings mounted on the cylindrical portion of the axle journal and an outer ring;
    said outer ring being equipped with a radial flange adapted for fastening a brake means and a wheel assembly, and with an axial tubular protuberance adapted for cooperating with said brake means and wheel assembly for centering purposes, said tubular protuberance having an outer end face;
    a mounting volume defined between said axial tubular protuberance of the outer ring and said threaded end portion of the axle journal and axially externally delimited by a radial plane substantially passing through one of said outer end faces of the threaded end portion and the axial tubular protuberance;
    a locking means mounted on said threaded end portion for axially locking the inner rings, said locking means having an external surface which faces radially;
    a pulse transmitter means located entirely in said mounting volume and fastened to the tubular protuberance;
    a radially oriented receptacle formed in said external surface of said locking means; and
    a sensor means radially inserted in said receptacle and facing the pulse transmitter means.
    said pulse transmitter means being fitted into and fastened to a cylindrical bore of the tubular protuberance, said tubular protuberance constituting means for centering the brake means and the wheel assembly, said pulse transmitter means comprising a cylindrical collar in which notches are made, said cylindrical collar having an inwardly directed radial end portion located on that side of the inner ring of the rolling bearing near said locking means, said radial end portion having a central circular orifice forming with said inner ring a narrow passage.

2. A vehicle wheel hub assembly according to claim 1, characterized in that a sealing lip is molded onto the central orifice of the radial end portion of the pulse transmitter means, said sealing lip adapted to rub against the inner ring of the rolling bearing.

3. A vehicle wheel hub assembly according to one of claims 1 or 2, further including a bonnet fixed to the locking means, said bonnet covering said locking means.

4. A vehicle wheel hub assembly according to one of claims 1 or 2, characterized in that said locking means includes a locking nut and a thick washer locked between said locking nut and said inner bearing ring, wherein said receptacle is formed in said thick washer.

5. A vehicle wheel hub assembly according to one of claims 1 or 2, characterized in that said locking means includes a locking nut, and said receptacle is formed in said locking nut.

6. A vehicle wheel hub assembly according to one of claims 1 or 2, characterized in that said locking means includes a locking nut and a base portion, and said receptacle is formed in said base portion.

7. A vehicle wheel hub assembly according to claim 1 further including electrical wires leading away from the sensor, said wires entering a duct made in the axle journal and being immobilized relative to the latter by means of a plug or a connector fitted into the orifice of the duct located on the side external relative to the vehicle.

8. A vehicle wheel hub assembly according to claim 1, further including a protective closing cover fitted into a bore of the tubular protuberance, said cover isolating the pulse transmitter means and the sensor means from the external environment.

9. A vehicle wheel hub assembly comprising:
an axle journal having a cylindrical portion and a threaded end portion with an outer end face;
an integral rolling bearing having two rows of rolling elements located between two inner rings mounted on the cylindrical portion of the axle journal and an outer ring;
said outer ring being equipped with a radial flank adapted for fastening a brake means and a wheel assembly, and with an axial tubular protuberance adapted for cooperating with said brake means and wheel assembly for centering purposes, said tubular protuberance having an outer end face;
a mounting volume defined radially by said axial tubular protuberance of the outer ring and axially externally delimited by a radial plane substantially passing through one of said outer end faces of the threaded end portion and the axial tubular protuberance;
a locking means mounted on said threaded end portion for axially locking the inner rings;
a pulse transmitter means located in said mounting volume and comprising a part in the form of a cylindrical collar fitted and fastened to the tubular protuberance and provided with radial perforations or teeth, and said cylindrical collar having an inwardly directed radial end portion located on a side of the inner ring near the locking means, said radial end portion having a central circular orifice forming with said inner ring a narrow passage; and
a sensor means mounted on said locking means and facing the pulse transmitter means.

10. A vehicle wheel hub assembly according to claim 9, characterized in that a sealing lip is molded onto said circular orifice of the radial end portion of the pulse transmitter means, said sealing lip adapted to rub against the inner ring of the roller bearing.

11. A vehicle wheel hub assembly according to claim 9, further including a bonnet fixed to said locking means, said bonnet covering said locking means.

12. A vehicle wheel hub assembly according to claim 9, characterized in that said locking means includes a thick washer locked between a locking nut and said inner bearing ring, wherein said sensor means is accommodated in said thick washer.

13. A vehicle wheel hub assembly according to claim 9, characterized in that said locking means includes a locking nut and a base portion.

14. A vehicle wheel assembly according to claim 13, characterized in that said sensor is accommodated in a receptacle formed in said locking nut.

15. A vehicle wheel hub assembly according to claim 13, characterized in that said sensor is accommodated in a receptacle formed in said base portion.

16. A vehicle hub wheel assembly according to claim 9, further including electrical wires leading away from the sensor means, said wires entering a duct made in the axle journal and being immobilized relative to the latter by means of a plug or a connector fitted into the orifice of the duct located on the side external relative to the vehicle.

17. A vehicle wheel hub assembly according to claim 9, further including a protective closing cover fitted into a bore of the tubular protuberance, said cover isolating the pulse transmitter means and the sensor means from the external environment.

18. A vehicle wheel hub assembly comprising:
an axle journal having a cylindrical portion and a threaded end portion with an outer end face;
an integral rolling bearing having two rows of rolling elements located between two inner rings mounted on the cylindrical portion of the axle journal and an outer ring;
said outer ring being equipped with a radial flange adapted for fastening a brake means and a wheel assembly, and with an axial tubular protuberance adapted for cooperating with said brake means and wheel assembly for centering purposes, said tubular protuberance having an outer end face;
a mounting volume defined between said axial tubular protuberance of the outer ring and said threaded end portion of the axle journal and axially externally delimited by a radial plane substantially passing through one of said outer end faces of the threaded end portion and the axial tubular protuberance;
a locking means mounted on said threaded end portion for axially locking the inner rings, said locking means having an external surface which faces radially;
a pulse transmitter means located entirely in said mounting volume and fastened to the tubular protuberance;
a radially oriented receptacle formed in said external surface of said locking means;

a sensor means radially inserted in said receptacle and facing the pulse transmitter means;

said vehicle wheel hub assembly further including a bonnet fixed to the locking means, said bonnet covering said locking means.

19. A vehicle wheel hub assembly according to claim 18, characterized in that the pulse transmitter means is fitted into and fastened to a cylindrical bore of the tubular protuberance, said tubular protuberance constituting means for centering the brake means and the wheel assembly.

20. A vehicle wheel hub assembly according to claim 18, characterized in that pulse transmitter means comprises a cylindrical collar in which notches are made, said cylindrical collar having an inwardly directed radial end portion located on that side of the inner ring of the rolling bearing near said locking means, said radial end portion having a central circular orifice forming with said inner ring a narrow passage.

21. A vehicle wheel hub assembly according to claim 20, characterized in that a sealing lip is molded onto the central orifice of the radial end portion of the pulse transmitter means, said sealing lip adapted to rub against the inner ring of the rolling bearing.

22. A vehicle wheel hub assembly comprising:
an axle journal having a cylindrical portion and a threaded end portion with an outer end face;
an integral rolling bearing having two rows of rolling elements located between two inner rings mounted on the cylindrical portion of the axle journal and an outer ring;
said outer ring being equipped with a radial flange adapted for fastening a brake means and a wheel assembly, and with an axial tubular protuberance adapted for cooperating with said brake means and wheel assembly for centering purposes, said tubular protuberance having an outer end face;
a mounting volume defined between said axial tubular protuberance of the outer ring and said threaded end portion of the axle journal and axially externally delimited by a radial plane substantially passing through one of said outer end faces of the threaded end portion and the axial tubular protuberance;
a locking means mounted on said threaded end portion for axially locking the inner rings, said locking means having an external surface which faces radially;
a pulse transmitter means located entirely in said mounting volume and fastened to the tubular protuberance;
a radially oriented receptacle formed in said external surface of said locking means; and
a sensor means radially inserted in said receptacle and facing the pulse transmitter means
said locking means including a locking nut and a thick washer locked between said locking nut and said inner bearing ring, wherein said receptacle is formed in said thick washer.

23. A vehicle wheel hub assembly according to claim 22, characterized in that the pulse transmitter means is fitted into and fastened to a cylindrical bore of the tubular protuberance, said tubular protuberance constituting means for centering the brake means and the wheel assembly.

24. A vehicle wheel hub assembly according to claim 22, characterized in that the pulse transmitter means comprises a cylindrical collar in which notches are made, said cylindrical collar having an inwardly directed radial end portion located on that side of the inner ring of the rolling bearing near said locking means, said radial end portion having a central circular orifice forming with said inner ring a narrow passage.

25. A vehicle wheel hub assembly according to claim 24, characterized in that a sealing lip is molded onto the central orifice of the radial end portion of the pulse transmitter means, said sealing lip adapted to rub against the inner ring of the rolling bearing.

26. A vehicle wheel hub assembly comprising:
an axle journal having a cylindrical portion and a threaded end portion with an outer end face;
an integral rolling bearing having two rows of rolling elements located between two inner rings mounted on the cylindrical portion of the axle journal and an outer ring;
said outer ring being equipped with a radial flange adapted for fastening a brake means and a wheel assembly, and with an axial tubular protuberance adapted for cooperating with said brake means and wheel assembly for centering purposes, said tubular protuberance having an outer end face;
a mounting volume defined between said axial tubular protuberance of the outer ring and said threaded end portion of the axle journal and axially externally delimited by a radial plane substantially passing through one of said outer end faces of the threaded end portion and the axial tubular protuberance;
a locking means mounted on said threaded end portion for axially locking the inner rings, said locking means having an external surface which faces radially;
a pulse transmitter means located entirely in said mounting volume and fastened to the tubular protuberance;
a radially oriented receptacle formed in said external surface of said locking means; and
a sensor means radially inserted in said receptacle and facing the pulse transmitter means
said locking means including a locking nut, said receptacle being formed in said locking nut.

27. A vehicle wheel hub assembly according to claim 26, characterized in that the pulse transmitter means is fitted into and fastened to a cylindrical bore of the tubular protuberance, said tubular protuberance constituting means for centering the brake means and the wheel assembly.

28. A vehicle wheel hub assembly according to claim 26, characterized in that the pulse transmitter means comprises a cylindrical collar in which notches are made, said cylindrical collar having an inwardly directed radial end portion located on that side of the inner ring of the rolling bearing near said locking means, said radial end portion having a central circular orifice forming with said inner ring a narrow passage.

29. A vehicle wheel hub assembly according to claim 28, characterized in that a sealing lip is molded onto the central orifice of the radial end portion of the pulse transmitter means, said sealing lip adapted to rub against the inner ring of the rolling bearing.

* * * * *